United States Patent
Jang et al.

(10) Patent No.: US 11,874,764 B2
(45) Date of Patent: Jan. 16, 2024

(54) METHOD AND SYSTEM FOR GUARANTEEING GAME QUALITY BY USING ARTIFICIAL INTELLIGENCE AGENT

(71) Applicant: ELECTRONICS AND TELECOMMUNICATIONS RESEARCH INSTITUTE, Daejeon (KR)

(72) Inventors: Si Hwan Jang, Daejeon (KR); Chan Sub Kim, Daejeon (KR); Seong Il Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 17/554,579

(22) Filed: Dec. 17, 2021

(65) Prior Publication Data
US 2022/0197784 A1 Jun. 23, 2022

(30) Foreign Application Priority Data
Dec. 17, 2020 (KR) .................. 10-2020-0177066

(51) Int. Cl.
G06F 11/36 (2006.01)
G06N 5/043 (2023.01)

(52) U.S. Cl.
CPC ........ G06F 11/3692 (2013.01); G06F 11/366 (2013.01); G06N 5/043 (2013.01)

(58) Field of Classification Search
CPC .... G06F 11/3692; G06F 11/366; G06N 5/043
See application file for complete search history.

(56) References Cited

U.S. PATENT DOCUMENTS 8,396,962 B2 3/2013 Cho et al.
10,282,280 B1 * 5/2019 Gouskova ............... A63F 13/70
(Continued)

FOREIGN PATENT DOCUMENTS

JP          6612306 B   11/2019
KR    1020190019009 A    2/2019
(Continued)

OTHER PUBLICATIONS

Tencé, Fabien, et al. "The challenge of believability in video games: Definitions, agents models and imitation learning." arXiv preprint arXiv:1009.0451 (2010). (Year: 2010).*
(Continued)

*Primary Examiner* — Kevin L Young
*Assistant Examiner* — Joanne G Macasiano

(57) ABSTRACT

A method of guaranteeing game quality by using an artificial intelligence (AI) agent is provided. The method includes extracting an item list (hereinafter referred to as an inspection item list) for inspecting quality of a target game, extracting and storing log data corresponding to a test performance result for each item of the inspection item list, performing imitation learning of an AI agent model on the basis of the stored log data, performing an automatic test for inspecting quality of the target game by using the AI agent model on which the imitation learning is completed, and automatically recording a bug and an error detected by the AI agent model.

6 Claims, 2 Drawing Sheets

(56) References Cited

U.S. PATENT DOCUMENTS

| | | |
|---|---|---|
| 2013/0040740 A1 | 2/2013 | Lee et al. |
| 2018/0285778 A1* | 10/2018 | Nori ................. G06F 18/254 |
| 2020/0179808 A1* | 6/2020 | Lee .................... G06F 18/23 |
| 2020/0192788 A1 | 6/2020 | Seo et al. |
| 2020/0234188 A1* | 7/2020 | Maffei Vallim ........ H04L 67/10 |
| 2021/0001231 A1* | 1/2021 | Kurabayashi .......... G06N 99/00 |
| 2021/0019663 A1* | 1/2021 | Veshchikov ........... G06N 20/20 |
| 2021/0089433 A1* | 3/2021 | Mattar ............... G06F 11/3688 |
| 2021/0287109 A1* | 9/2021 | Cmielowski ........ G06F 11/3692 |
| 2021/0346798 A1* | 11/2021 | Borovikov ............... G06N 7/01 |
| 2021/0366183 A1* | 11/2021 | Gisslén .................. G06N 20/00 |

FOREIGN PATENT DOCUMENTS

| | | |
|---|---|---|
| KR | 102022635 B | 9/2019 |
| KR | 1020200071645 A | 6/2020 |

OTHER PUBLICATIONS

Harmer, Jack, et al. "Imitation learning with concurrent actions in 3d games." 2018 IEEE Conference on Computational Intelligence and Games (CIG). IEEE, 2018. (Year: 2018).*

Zhen, Yang, Zhang Wanpeng, and Liu Hongfu. "Artificial intelligence techniques on real-time strategy games." Proceedings of the 2018 2nd International Conference on Computer Science and Artificial Intelligence. 2018. (Year: 2018).*

* cited by examiner

METHOD AND SYSTEM FOR GUARANTEEING GAME QUALITY BY USING ARTIFICIAL INTELLIGENCE AGENT

CROSS-REFERENCE TO RELATED APPLICATIONS

This application claims priority under 35 U.S.C. § 119 to Korean Patent Application No. 10-2020-0177066, filed on Dec. 17, 2020, the disclosure of which is incorporated herein by reference in its entirety.

TECHNICAL FIELD

The present invention relates to a method and system for guaranteeing game quality by using an artificial intelligence (AI) agent.

BACKGROUND

Game quality assurance (QA) denotes that various tests and inspection operations are performed before a product is released, in order for a game to have certain-level quality. Such game QA is continuously realized during a total life cycle including development, operating, and maintenance from a project step of creating an initial game.

However, in the related art, a manager detects an error and/or the like while directly playing a game or verifies an error and/or the like through automatic repeated processing on the basis of a rule, but there is a drawback where the manager does not flexibly respond to various environment changes and extension application in a target game.

PRIOR ART REFERENCE

Patent Document

Korean Patent Publication No. 10-2019-0019009 (2019. 2.26.)

SUMMARY

Accordingly, the present invention provides a method and system for guaranteeing game quality by using an AI agent, which automatically test a functional operation of a target game by using an imitation learning-based AI agent which has learned in-game play.

The objects of the present invention are not limited to the aforesaid, but other objects not described herein will be clearly understood by those skilled in the art from descriptions below.

In one general aspect, a method of guaranteeing game quality by using an artificial intelligence (AI) agent includes: extracting an item list (hereinafter referred to as an inspection item list) for inspecting quality of a target game; extracting and storing log data corresponding to a test performance result for each item of the inspection item list; performing imitation learning of an AI agent model on the basis of the stored log data; performing an automatic test for inspecting quality of the target game by using the AI agent model on which the imitation learning is completed; and automatically recording a bug and an error detected by the AI agent model.

In another general aspect, a system for guaranteeing game quality by using an artificial intelligence (AI) agent includes: a communication module configured to receive a test performance result for each item of an item list (hereinafter referred to as an inspection item list) for inspecting quality of a target game; a memory configured to store a program for automatically detecting a bug and an error of the target game on the basis of an AI agent model; and a processor configured to execute the program stored in the memory, wherein, by executing the program, the processor extracts and stores log data corresponding to a test performance result for each item of the inspection item list of the target game, performs imitation learning of the AI agent model on the basis of the stored log data, performs an automatic test for inspecting quality of the target game by using the AI agent model on which the imitation learning is completed, and automatically records a bug and an error detected by the AI agent model.

A computer program according to another embodiment of the present invention for solving the above-described problem may be coupled to a computer which is hardware, may execute a method of guaranteeing game quality by using an AI agent, and may be stored in a computer-readable recording medium.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings. It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present invention, and similarly, the second element may also be referred to as the first element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
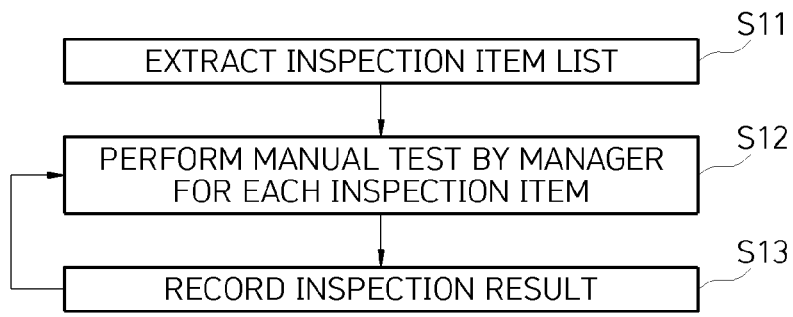
FIGS. 1A and 1B are diagrams for describing a game test method of the related art.
Figure 1B:
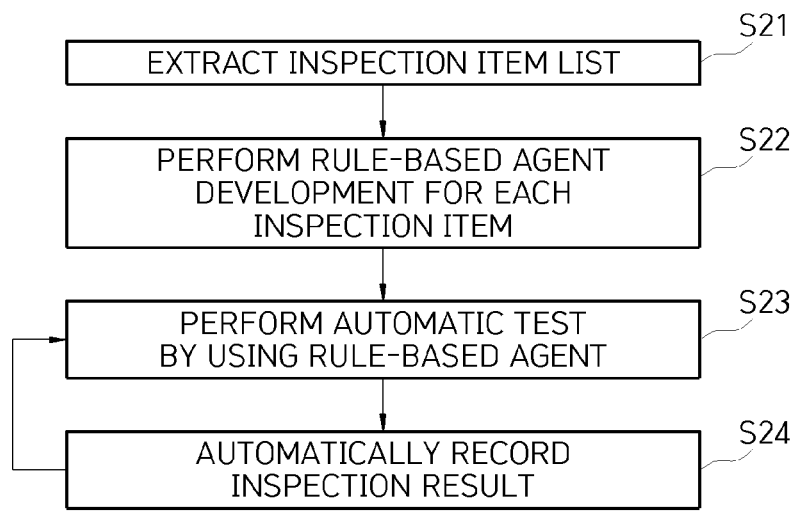

FIGS. 1A and 1B are diagrams for describing a game test method of the related art.

In a verification process of guaranteeing game quality, a play function, performance, stability, suitability, a balance test, and the like may be performed.

In the related art, in order to detect an error of a game, an inspection item list may be extracted as in FIG. 1A in step S11, and like a method of verifying, by a game master which is a manager, an error while directly playing a game or verifying an error by collecting a selected user group and performing a focus group test (FGT), the game master may perform a manual test on each inspection item while directly playing a game in step S12, and then, may manually recording an inspection result in step S13.

Particularly, in the field of games, an update may be performed at every week which is a short period, and in each update, the GM may directly play a game generally and may manually test a function and performance on the basis of a predetermined inspection list. At this time, an inspection time may increase due to limited resources such as time, cost, and manpower, or problems where unpredicted errors which are not in the inspection list may be lately detected, causing large loss.

As an example of research and development for game QA automation, as in FIG. 1B, a rule-based agent may be developed and may be applied to a test. In such a rule-based test, the inspection item list may be first extracted in step S21, a rule-based agent may be developed for each inspection item in step S22, and a test may be automatically performed on a target game by using the rule-based agent in step S23. Also, as the test is completed, an inspection result may be automatically recorded in step S24.

In a case which uses the rule-based agent, as in FIG. 1A, there may be an advantage where an endeavor of the manager for manually testing game quality is reduced, but because predetermined simple play is inevitably repeated, there may be a limitation where the agent is not adapted to an environment change and is not applied to the other tests.

Moreover, in a case where device farm for a mobile application test is constructed, the test may be merely a total test for responding to a device spec or a display size fragmented in a different environment.

In an embodiment of the present invention for solving such a problem, a method and system 100 for guaranteeing game quality by using an AI agent, which automatically tests a functional operation of a target game by using an imitation learning-based AI agent which has learned in-game play, may be provided.

Hereinafter, a method for guaranteeing game quality by using an AI agent (hereinafter referred to as a game quality guaranteeing method) according to an embodiment of the present invention will be described with reference to FIG. 2.

Figure 2:
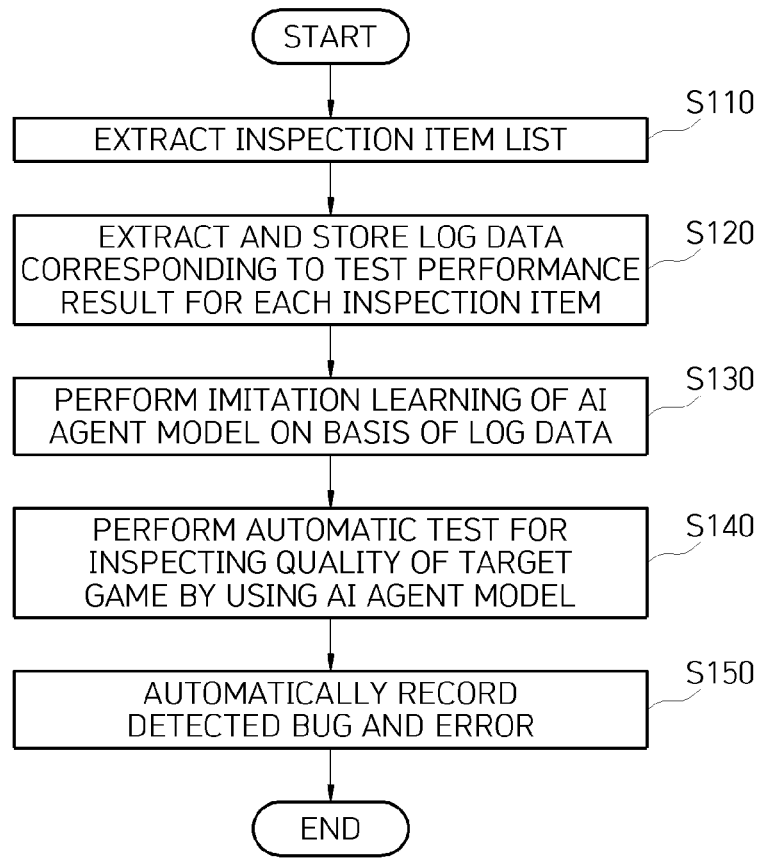
FIG. 2 is a flowchart of a method of guaranteeing game quality according to an embodiment of the present invention.

FIG. 2 is a flowchart of a game quality guaranteeing method according to an embodiment of the present invention.

In each of steps illustrated in FIG. 2, it may be understood that each step illustrated in FIG. 2 is performed by the game quality guaranteeing system 100 using an AI agent described below, but the present embodiment is not limited thereto.

The game quality guaranteeing method according to an embodiment of the present invention may include a step (S110) of extracting an item list (hereinafter referred to as an inspection item list) for inspecting the quality of a target game, a step (S120) of extracting and storing log data corresponding to a test performance result of each item of the inspection item list, a step (S130) of performing imitation learning of an AI agent model on the basis of the stored log data, a step (S140) of performing an automatic test for inspecting the quality of the target game by using the AI agent model on which the imitation learning is completed, and a step (S150) of automatically recording a bug and an error detected by the AI agent model.

First, the system 100 may extract the inspection item list for inspecting the quality of the target game in step S110.

In this case, the inspection item list may be extracted based on a plan previously negotiated by game managers. Alternatively, the inspection item list may be automatically extracted based on a predetermined rule.

Subsequently, the system 100 may extract and store the log data corresponding to the test performance result of each item of the inspection item list in step S120.

Here, a test performed on each item of the inspection item list may be manually performed by a manager, but is not limited thereto.

In an embodiment, the system 100 may receive the test performance result of each item which has been performed once or a plurality of times, on the basis of a requirement method of the AI agent model which is a learning target, and thus, may extract and store log data corresponding thereto.

In an embodiment, the system 100 may extract and store, as log data of each item of the inspection item list, in-game action and environment interaction information about a target game executed by the manager.

Subsequently, the system 100 may perform imitation learning of the AI agent model imitating in-game play on the basis of the stored log data in step S130.

At this time, the system 100 may perform imitation learning by using the stored log data as an input value of each of different AI agent models for each item of the inspection item list.

Moreover, the system 100 may not classify the log data by units of AI agent model for each item of the inspection item list and may perform imitation learning by using the log data as a random input value.

Unlike such an embodiment, the system 100 may perform imitation learning, which uses the stored log data as an input value of each of different AI agent models for each item of the inspection item list, and imitation learning which does not classify the log data by units of AI agent model for each item of the inspection item list and uses the log data as a random input value.

Subsequently, the system 100 may perform an automatic test for inspecting the quality of a target game by using an AI agent model on which imitation learning is completed in step S140 and may automatically record a bug and an error detected by the AI agent model in step S150.

At this time, the system 100 may perform an automatic test for inspecting the quality of a target game by using an AI agent model pool including an AI agent model for each item of an inspection item list on which imitation learning is completed.

In the above description, according to an implementation embodiment of the present invention, steps S110 to S150 may be further divided into additional steps, or may be combined as fewer steps. Also, some steps may be omitted depending on the case, and a sequence between steps may be changed. Furthermore, despite the other omitted content, the description of FIG. 2 may also be applied to the game quality guaranteeing system 100 using the AI agent of FIG. 3.

Hereinafter, a system 100 for guaranteeing game quality (hereinafter referred to as a game quality guaranteeing system) by using an AI agent according to an embodiment of the present invention will be described with reference to FIG. 3.

Figure 3:
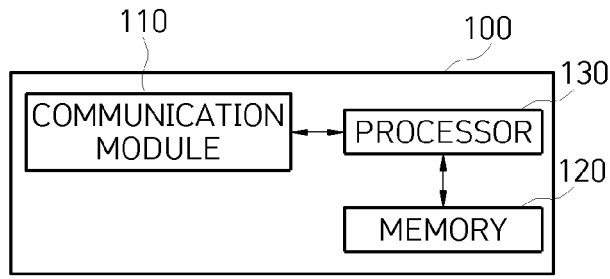
FIG. 3 is a block diagram of a system for guaranteeing game quality according to an embodiment of the present invention.

FIG. 3 is a block diagram of a game quality guaranteeing system 100 according to an embodiment of the present invention.

The game quality guaranteeing system 100 according to an embodiment of the present invention may include a communication module 110, a memory 120, and a processor 130.

The communication module 110 may receive a test performance result for each item of an inspection item list for inspecting the quality of a target game.

A program for automatically detecting a bug and an error of the target game on the basis of an AI agent model may be stored in the memory 120, and the processor 130 may execute the program stored in the memory 120.

The processor 130 may extract and store log data corresponding to the test performance result for each item of the inspection item list for inspecting the quality of the target game and may perform imitation learning of the AI agent model on the basis of the stored log data.

Moreover, the processor 130 may perform an automatic test for inspecting the quality of the target game by using the AI agent model on which imitation learning is completed and may automatically record a bug and an error detected by the AI agent model.

An embodiment of the present invention described above may have advantages listed in the following Table 1 compared to the related art described above with reference to FIGS. 1A and 1B.

The above-described program may include a code encoded as a computer language such as C, C++, JAVA, or machine language readable by a processor (CPU) of a computer through a device interface of the computer, so that the computer reads the program and executes the methods implemented as the program. Such a code may include a functional code associated with a function defining functions needed for executing the methods, and moreover, may include an execution procedure-related control code needed for executing the functions by using the processor of the computer on the basis of a predetermined procedure. Also, the code may further include additional information, needed for executing the functions by using the processor of the computer, or a memory reference-related code corresponding to a location (an address) of an internal or external memory of the computer, which is to be referred to by a media. Also, when the processor needs communication with a remote computer or server so as to execute the functions, the code may further include a communication-related code corresponding to a communication scheme needed for communication with the remote computer or server and information or a media to be transmitted or received in performing communication, by using a communication module of the computer.

The stored medium may denote a device-readable medium semi-permanently storing data, instead of a medium storing data for a short moment like a register, a cache, and a memory. In detail, examples of the stored medium may include read only memory (ROM), random access memory (RAM), CD-ROM, a magnetic tape, floppy disk, and an optical data storage device, but are not limited thereto. That is, the program may be stored in various recording mediums of various servers accessible by the computer or various recording mediums of the computer of a user. Also, the medium may be distributed to computer systems connected to one another over a network and may store a code readable by a computer in a distributed scheme.

TABLE 1

| Division | The Related Art 1(FIG. 1A) | The Related Art 1(FIG. 1B) | Proposed Technology |
| --- | --- | --- | --- |
| Test subject | QA manager | Rule-based agent | AI agent |
| Test method | Manual repeated test | Automatic repeated test | Automatic repeated test |
| Simultaneous test processing | Single processing | A plurality of processing | A plurality of processing |
| Test target | Inspection item list | Inspection item list | Inspection item list Additional error and bug detection other than inspection item |
| Environment change | Manual reaction | Limited reaction New development is needed in each environment change | Flexible reaction Agent action space, maintenance of observation function is needed |
| Extension | Manual reaction | Impossible | In a case where game genre or an operation function is similar, extension application is possible Continuous learning, domain adaptation is possible |

An embodiment of the present invention described above may be implemented as a program (or an application) and may be stored in a medium, so as to be executed in connection with a server which is hardware.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

In the embodiments of the present invention described above, a functional operation may be automatically tested by using an AI agent which imitates in-game play, and particularly, the efficiency of game QA may be more enhanced than direct manual repetition method and a rule-based automatic repetition method.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of guaranteeing game quality by using an artificial intelligence (AI) agent, the method performed by a computer comprising:
    extracting an inspection item list for inspecting quality of a target game;
    extracting and storing log data corresponding to a test performance result for each item of the inspection item list;
    performing imitation learning of an AI agent model on the basis of the stored log data;
    performing an automatic test for inspecting quality of the target game by using the AI agent model on which the imitation learning is completed; and
    automatically recording a bug and an error detected by the AI agent model,
    wherein performing imitation learning of the AI agent model comprises performing imitation learning, which uses the stored log data as an input value of each of different AI agent models for each item of the inspection item list, and imitation learning which uses the stored log data as a random input value without classifying, for each item of the inspection item list, the stored log data by units of AI agent model, and
    wherein performing the automatic test comprises performing the automatic test by using an AI agent model pool including an AI agent model for each item of the inspection item list on which the imitation learning is completed.

2. The method of claim 1, wherein extracting and storing the log data comprises extracting and storing log data corresponding to a test performance result for each item of the inspection item list at least once or more, on the basis of a requirement method of an AI agent model which is a learning target.

3. The method of claim 1, wherein extracting and storing the log data comprises extracting and storing, as log data of each item of the inspection item list, in-game action and environment interaction information about the target game executed by a manager.

4. A system for guaranteeing game quality by using an artificial intelligence (AI) agent, the system comprising:
    a memory storing a program for automatically detecting a bug and an error of a target game on the basis of an AI agent model; and
    a processor configured to execute the program stored in the memory,
    wherein, by executing the program, the processor:
        receives a test performance result for each item of an inspection item list for inspecting quality of the target game,
        extracts and stores log data corresponding to a test performance result for each item of the inspection item list of the target game,
        performs imitation learning of the AI agent model on the basis of the stored log data, performs an automatic test for inspecting quality of the target game by using the AI agent model on which the imitation learning is completed, and
        automatically records a bug and an error detected by the AI agent model,
        wherein the processor performs imitation learning, which uses the stored log data as an input value of each of different AI agent models for each item of the inspection item list, and imitation learning which uses the stored log data as a random input value without classifying, for each item of the inspection item list, the stored log data by units of AI agent model, and
        wherein the processor performs an automatic test for inspecting quality of the target game by using an AI agent model pool including an AI agent model for each item of the inspection item list on which the imitation learning is completed.

5. The system of claim 4, wherein the processor extracts and stores log data corresponding to a test performance result for each item of the inspection item list at least once or more, on the basis of a requirement method of a learning target model.

6. The system of claim 4, wherein the processor extracts and stores, as log data of each item of the inspection item list, in-game action and environment interaction information about the target game executed by a manager.

* * * * *